(12) United States Patent
Engbrecht et al.

(10) Patent No.: US 8,070,895 B2
(45) Date of Patent: Dec. 6, 2011

(54) WATER RESISTANT CEMENTITIOUS ARTICLE AND METHOD FOR PREPARING SAME

(75) Inventors: Dick C. Engbrecht, Arlington Heights, IL (US); Qingxia Liu, Vernon Hills, IL (US); Michael P. Shake, Johnsburg, IL (US); Xuming Wang, Mundelein, IL (US); David Paul Miller, Lindenhurst, IL (US); Michael L. Bolind, Ingelside, IL (US); Paul Reed, Kankakee, IL (US); Donald L. Roelfs, West Burlington, IA (US); Rafael Bury, Wheeling, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 11/738,316

(22) Filed: Apr. 20, 2007

(65) Prior Publication Data

US 2008/0190062 A1     Aug. 14, 2008

Related U.S. Application Data

(60) Provisional application No. 60/889,487, filed on Feb. 12, 2007.

(51) Int. Cl.
*B29C 65/00* (2006.01)
*B32B 13/00* (2006.01)
*B32B 37/00* (2006.01)
*B32B 29/00* (2006.01)

(52) U.S. Cl. ............... 156/39; 156/41; 156/45
(58) Field of Classification Search ............ 156/39, 156/41, 45
See application file for complete search history.

(56) References Cited

U.S. PATENT DOCUMENTS

| | | |
|---|---|---|
| 1,870,439 A | 8/1932 | Birdsey |
| 2,127,952 A | 8/1938 | Choate |
| 2,198,766 A | 4/1940 | Gallagher |
| 2,198,776 A | 4/1940 | King et al. |
| 2,216,207 A | 10/1940 | Menaul |
| 2,413,458 A | 12/1946 | Light |
| 2,425,883 A | 8/1947 | Jackson |
| 2,560,521 A * | 7/1951 | Camp ............ 156/41 |
| 2,681,863 A | 6/1954 | Croce et al. |
| 2,803,575 A | 8/1957 | Riddell et al. |
| 2,806,811 A | 9/1957 | Hazmburg |
| 2,907,667 A | 10/1959 | Johnson |
| 2,970,127 A | 1/1961 | Slayter et al. |
| 3,086,953 A | 4/1963 | Nitzsche et al. |
| 3,155,567 A | 11/1964 | Harr |
| 3,259,536 A | 7/1966 | Gaeth et al. |
| 3,297,601 A | 1/1967 | Maynard et al. |
| 3,298,973 A | 1/1967 | Quarles et al. |
| 3,359,146 A | 12/1967 | Lane et al. |
| 3,382,083 A | 5/1968 | Marsden et al. |
| 3,389,042 A | 6/1968 | Bieri et al. |
| 3,455,710 A | 7/1969 | Nitzsche et al. |
| 3,459,571 A | 8/1969 | Shannon |
| 3,462,341 A | 8/1969 | Littin |
| 3,490,065 A | 1/1970 | Shannon et al. |
| 3,503,841 A | 3/1970 | Sterrett |
| 3,516,882 A | 6/1970 | Cummisford |
| 3,615,189 A | 10/1971 | Hayakawa et al. |
| 3,616,173 A | 10/1971 | Green et al. |
| 3,623,895 A | 11/1971 | Nitzsche et al. |
| 3,645,707 A | 2/1972 | Philipps |
| 3,650,785 A | 3/1972 | Ball et al. |
| 3,660,068 A | 5/1972 | Wilson |
| 3,663,168 A | 5/1972 | Rubin et al. |
| 3,663,355 A | 5/1972 | Shimizu et al. |
| 3,676,094 A | 7/1972 | Russell |
| 3,699,212 A | 10/1972 | Palm |
| 3,770,468 A | 11/1973 | Knauf et al. |
| 3,781,396 A | 12/1973 | Okuda et al. |
| 3,788,020 A | 1/1974 | Gregori |
| 3,839,059 A | 10/1974 | Rothfelder et al. |
| 3,839,239 A | 10/1974 | Godfried |

(Continued)

FOREIGN PATENT DOCUMENTS

AU     69055-74     11/1975

(Continued)

OTHER PUBLICATIONS

Grodzka, P. et al.; On the Development of Heat Storage Building Materials; Conf-820814-23; DE82 020814; Library of Congress Newspaper RM.

(Continued)

*Primary Examiner* — Philip Tucker
*Assistant Examiner* — Michael N Orlando
(74) *Attorney, Agent, or Firm* — Leydig, Voit & Mayer, Ltd.; Philip T. Petti; David F. Janci

(57) ABSTRACT

A fibrous mat-faced cementitious article comprising (a) a cementitious core, and (b) a first fibrous mat comprising polymer or mineral fibers and a hydrophobic finish on at least one surface thereof, wherein the hydrophobic finish is in contact with the cementitious core, and a method of preparing a fibrous mat-faced cementitious article, as well as a method of preparing a water-resistant cementitious article comprising (a) preparing an aqueous siloxane dispersion, wherein the dispersion comprises about 4 wt. % to about 8 wt. % siloxane, (b) combining the siloxane dispersion with a cementitious mixture to provide a cementitious slurry, (c) depositing the cementitious slurry onto a substrate, and (d) allowing the cementitious slurry to harden, thereby providing a cementitious article.

20 Claims, No Drawings

U.S. PATENT DOCUMENTS

| | | |
|---|---|---|
| 3,839,836 A | 10/1974 | Payne |
| 3,841,886 A | 10/1974 | Burr |
| 3,847,766 A | 11/1974 | Klaus |
| 3,857,934 A | 12/1974 | Bernstein et al. |
| 3,874,980 A | 4/1975 | Richards et al. |
| 3,903,879 A | 9/1975 | Riley et al. |
| 3,908,062 A | 9/1975 | Roberts |
| 3,915,919 A | 10/1975 | Nishioka et al. |
| 3,922,413 A | 11/1975 | Reineman |
| 3,922,459 A | 11/1975 | Franz et al. |
| 3,934,066 A | 1/1976 | Murch |
| 3,935,021 A | 1/1976 | Greve et al. |
| 3,935,343 A | 1/1976 | Nuttall |
| 3,936,414 A | 2/1976 | Wright et al. |
| 3,944,698 A | 3/1976 | Dierks et al. |
| 3,949,144 A | 4/1976 | Duff |
| 3,951,675 A | 4/1976 | Krempff |
| 3,951,735 A | 4/1976 | Kondo et al. |
| 3,955,031 A | 5/1976 | Jones et al. |
| 3,957,501 A | 5/1976 | Matsuda et al. |
| 3,964,256 A | 6/1976 | Plantif et al. |
| 3,967,016 A | 6/1976 | Schneller et al. |
| 3,977,888 A | 8/1976 | Sano et al. |
| 3,980,487 A | 9/1976 | Akabayashi et al. |
| 3,987,600 A | 10/1976 | Baehr |
| 3,993,822 A | 11/1976 | Knauf et al. |
| 3,994,110 A | 11/1976 | Ropella |
| 3,998,023 A | 12/1976 | Anderson |
| 4,005,959 A | 2/1977 | Kautz |
| 4,009,062 A | 2/1977 | Long |
| 4,010,134 A | 3/1977 | Braunisch et al. |
| 4,015,386 A | 4/1977 | Cook |
| 4,027,043 A | 5/1977 | Schroeder et al. |
| 4,028,125 A | 6/1977 | Martin |
| 4,028,158 A | 6/1977 | Hipchen et al. |
| 4,036,658 A | 7/1977 | Pühringer et al. |
| 4,036,659 A | 7/1977 | Stude |
| 4,040,950 A | 8/1977 | Zipperian et al. |
| 4,042,536 A | 8/1977 | Dieterich et al. |
| 4,043,862 A | 8/1977 | Roberts |
| 4,043,950 A | 8/1977 | Wilmsen et al. |
| 4,044,520 A | 8/1977 | Barrows |
| 4,049,778 A | 9/1977 | Hodgson |
| 4,054,461 A | 10/1977 | Martin |
| 4,054,462 A | 10/1977 | Stude |
| 4,063,976 A | 12/1977 | Wain et al. |
| 4,065,413 A * | 12/1977 | MacInnis et al. ............... 524/14 |
| 4,065,597 A | 12/1977 | Gillespie |
| 4,070,311 A | 1/1978 | Cominassi et al. |
| 4,075,804 A | 2/1978 | Zimmerman |
| 4,076,580 A | 2/1978 | Panusch et al. |
| 4,081,598 A | 3/1978 | Morgan et al. |
| 4,088,738 A | 5/1978 | Hauge |
| 4,094,694 A | 6/1978 | Long |
| 4,097,423 A | 6/1978 | Dieterich |
| 4,101,335 A | 7/1978 | Barrable |
| 4,101,475 A | 7/1978 | Stalego |
| 4,102,697 A | 7/1978 | Fukuba et al. |
| 4,107,376 A | 8/1978 | Ishikawa |
| 4,112,174 A | 9/1978 | Hannes et al. |
| 4,113,913 A | 9/1978 | Smiley |
| 4,125,498 A | 11/1978 | Blount |
| 4,136,215 A | 1/1979 | den Otter et al. |
| 4,148,781 A | 4/1979 | Narukawa et al. |
| 4,154,593 A | 5/1979 | Brown et al. |
| 4,165,413 A | 8/1979 | Sefton et al. |
| 4,169,907 A | 10/1979 | Barker et al. |
| 4,174,230 A | 11/1979 | Hashimoto et al. |
| 4,183,908 A | 1/1980 | Rolfe |
| 4,184,022 A | 1/1980 | Lawyer |
| 4,186,236 A | 1/1980 | Heitmann |
| 4,187,130 A | 2/1980 | Kautz |
| 4,195,110 A | 3/1980 | Dierks et al. |
| 4,197,225 A | 4/1980 | Emmons et al. |
| 4,203,788 A | 5/1980 | Clear |
| 4,204,030 A | 5/1980 | Takamizawa et al. |
| 4,205,136 A | 5/1980 | Ohashi et al. |
| 4,210,725 A | 7/1980 | Redfarn |
| 4,214,027 A | 7/1980 | Knuaf et al. |
| 4,217,333 A | 8/1980 | Löblich |
| 4,221,697 A | 9/1980 | Osborn et al. |
| 4,230,616 A | 10/1980 | Godfried |
| 4,233,343 A | 11/1980 | Barker et al. |
| 4,233,368 A | 11/1980 | Baehr et al. |
| 4,236,911 A | 12/1980 | McCullough et al. |
| 4,242,406 A | 12/1980 | El Bouhnini et al. |
| 4,242,407 A | 12/1980 | Bijen |
| 4,245,029 A | 1/1981 | Crivello |
| 4,255,483 A | 3/1981 | Byrd et al. |
| 4,256,799 A | 3/1981 | Ohashi et al. |
| 4,258,102 A | 3/1981 | Traver et al. |
| 4,265,964 A | 5/1981 | Burkhart |
| 4,265,979 A | 5/1981 | Baehr et al. |
| 4,292,353 A | 9/1981 | Ohashi et al. |
| 4,296,015 A | 10/1981 | Aotani et al. |
| 4,296,169 A | 10/1981 | Shannon |
| 4,297,311 A | 10/1981 | Sherman et al. |
| 4,304,877 A | 12/1981 | Blount |
| 4,306,395 A | 12/1981 | Carpenter |
| 4,311,767 A | 1/1982 | Kennedy |
| 4,315,967 A | 2/1982 | Prior et al. |
| 4,322,301 A | 3/1982 | Blackmore |
| 4,324,775 A | 4/1982 | Tung |
| 4,327,143 A | 4/1982 | Alvino et al. |
| 4,327,146 A | 4/1982 | White |
| 4,341,560 A | 7/1982 | Saito et al. |
| 4,343,127 A | 8/1982 | Greve et al. |
| 4,344,804 A | 8/1982 | Bijen et al. |
| 4,350,533 A | 9/1982 | Galer et al. |
| 4,360,386 A | 11/1982 | Bounini |
| 4,361,616 A | 11/1982 | Bömers |
| 4,361,995 A | 12/1982 | Buck et al. |
| 4,364,991 A | 12/1982 | Byrd et al. |
| 4,372,814 A | 2/1983 | Johnstone et al. |
| 4,372,997 A | 2/1983 | Fritze et al. |
| 4,376,674 A | 3/1983 | Ali |
| 4,378,405 A | 3/1983 | Pilgrim |
| 4,380,592 A | 4/1983 | Blount |
| 4,381,716 A | 5/1983 | Hastings et al. |
| 4,388,366 A | 6/1983 | Rosato et al. |
| 4,392,896 A | 7/1983 | Sakakibara |
| 4,393,015 A | 7/1983 | Kaneda et al. |
| 4,394,411 A | 7/1983 | Krüll et al. |
| 4,399,046 A | 8/1983 | Okamura et al. |
| 4,399,110 A | 8/1983 | Kurandt |
| 4,403,006 A | 9/1983 | Bruce et al. |
| 4,406,738 A | 9/1983 | Fink et al. |
| 4,407,884 A | 10/1983 | Witt |
| 4,411,701 A | 10/1983 | Saito et al. |
| 4,411,702 A | 10/1983 | Makino et al. |
| 4,421,704 A * | 12/1983 | Reily ............................ 264/133 |
| 4,433,020 A | 2/1984 | Narukawa et al. |
| 4,433,069 A | 2/1984 | Harper |
| 4,436,645 A | 3/1984 | Ceaser |
| 4,441,944 A | 4/1984 | Massey |
| 4,447,254 A | 5/1984 | Hughes et al. |
| 4,447,498 A | 5/1984 | Fink et al. |
| 4,450,022 A | 5/1984 | Galer |
| 4,462,831 A | 7/1984 | Raevsky et al. |
| 4,463,043 A | 7/1984 | Reeves et al. |
| 4,477,300 A | 10/1984 | Pilgrim |
| 4,477,533 A | 10/1984 | Phillips |
| 4,486,476 A | 12/1984 | Fritsch et al. |
| 4,489,176 A | 12/1984 | Kluth et al. |
| 4,501,787 A | 2/1985 | Marchetti et al. |
| 4,502,901 A | 3/1985 | Burkard |
| 4,504,533 A | 3/1985 | Altenhöfer et al. |
| 4,508,774 A | 4/1985 | Grabhoefer et al. |
| 4,517,095 A | 5/1985 | Ceaser |
| 4,518,508 A | 5/1985 | Conner |
| 4,518,652 A | 5/1985 | Willoughby |
| 4,529,705 A | 7/1985 | Larsen |
| 4,543,281 A | 9/1985 | Pedersen et al. |
| 4,544,424 A | 10/1985 | Take et al. |
| 4,557,961 A | 12/1985 | Gorges |
| 4,557,973 A | 12/1985 | Ali |
| 4,563,285 A | 1/1986 | Nair et al. |

| Patent No. | Kind | Date | Inventor(s) | Ref |
|---|---|---|---|---|
| 4,564,544 | A | 1/1986 | Burkard et al. | |
| 4,572,865 | A | 2/1986 | Gluck et al. | |
| 4,578,301 | A | 3/1986 | Currie et al. | |
| 4,613,627 | A | 9/1986 | Sherman et al. | |
| 4,618,642 | A | 10/1986 | Schoenherr | |
| 4,619,655 | A | 10/1986 | Hanker et al. | |
| 4,619,701 | A | 10/1986 | Angrick et al. | |
| 4,636,538 | A | 1/1987 | Malcolm-Brown | |
| 4,637,951 | A | 1/1987 | Gill et al. | |
| 4,643,771 | A | 2/1987 | Steinbach et al. | |
| 4,645,548 | A | 2/1987 | Take et al. | |
| 4,646,494 | A | 3/1987 | Saarinen et al. | |
| 4,647,496 | A | 3/1987 | Lehnert et al. | |
| 4,664,707 | A | 5/1987 | Wilson et al. | |
| 4,681,798 | A | 7/1987 | Gill et al. | |
| 4,684,567 | A | 8/1987 | Okamoto et al. | |
| 4,704,263 | A | 11/1987 | Berry et al. | |
| 4,729,853 | A | 3/1988 | von Bonin | |
| 4,746,365 | A | 5/1988 | Babcock et al. | |
| 4,748,051 | A | 5/1988 | Songer et al. | |
| 4,748,771 | A | 6/1988 | Lehnert et al. | |
| 4,759,964 | A | 7/1988 | Fischer et al. | |
| 4,767,656 | A | 8/1988 | Chee et al. | |
| 4,772,326 | A | 9/1988 | Heinen et al. | |
| 4,784,897 | A | 11/1988 | Brands et al. | |
| 4,810,552 | A | 3/1989 | Meyer | |
| 4,810,569 | A | 3/1989 | Lehnert et al. | |
| 4,849,018 | A | 7/1989 | Babcock et al. | |
| 4,857,211 | A | 8/1989 | Nineuil et al. | |
| 4,861,397 | A | 8/1989 | Hillstrom | |
| 4,879,173 | A | 11/1989 | Randall | |
| 4,904,694 | A | 2/1990 | Matsuoka et al. | |
| 4,916,004 | A | 4/1990 | Ensminger et al. | |
| 4,927,463 | A | 5/1990 | Kloetzer et al. | |
| 4,948,647 | A | 8/1990 | Burkard | |
| 4,975,122 | A | 12/1990 | Parkinson et al. | |
| 4,992,481 | A | 2/1991 | von Bonin et al. | |
| 4,999,066 | A | 3/1991 | Sherif | |
| 5,062,235 | A | 11/1991 | Cook, Jr. et al. | |
| 5,068,103 | A | 11/1991 | Kawazi et al. | |
| 5,073,198 | A | 12/1991 | Kurz | |
| 5,079,078 | A | 1/1992 | Jutte, Jr. et al. | |
| 5,082,501 | A | 1/1992 | Kurz | |
| 5,091,441 | A | 2/1992 | Omura | |
| 5,100,948 | A | 3/1992 | Aydin et al. | |
| 5,112,678 | A | 5/1992 | Gay et al. | |
| 5,118,336 | A | 6/1992 | Biez | |
| 5,120,355 | A * | 6/1992 | Imai | 106/2 |
| 5,135,805 | A | 8/1992 | Sellers et al. | |
| 5,141,561 | A | 8/1992 | Ledard et al. | |
| 5,148,645 | A | 9/1992 | Lehnert et al. | |
| 5,149,368 | A | 9/1992 | Liu et al. | |
| 5,155,959 | A | 10/1992 | Richards et al. | |
| 5,160,639 | A | 11/1992 | McCollum | |
| 5,171,366 | A | 12/1992 | Richards et al. | |
| 5,198,052 | A | 3/1993 | Ali | |
| 5,220,762 | A | 6/1993 | Lehnert et al. | |
| 5,258,069 | A | 11/1993 | Knechtel et al. | |
| 5,281,265 | A | 1/1994 | Liu | |
| 5,284,700 | A | 2/1994 | Strauss et al. | |
| 5,292,781 | A | 3/1994 | Floyd | |
| 5,296,026 | A | 3/1994 | Monroe et al. | |
| 5,304,239 | A | 4/1994 | Schwabe et al. | |
| 5,308,692 | A | 5/1994 | Kennedy et al. | |
| 5,319,900 | A | 6/1994 | Lehnert et al. | |
| 5,320,677 | A | 6/1994 | Baig | |
| 5,336,316 | A | 8/1994 | Dawson et al. | |
| 5,340,392 | A | 8/1994 | Westbrook et al. | |
| 5,342,680 | A | 8/1994 | Randall | |
| 5,366,507 | A | 11/1994 | Sottosanti | |
| 5,366,810 | A | 11/1994 | Merrifield et al. | |
| 5,371,989 | A | 12/1994 | Lehnert et al. | |
| 5,389,716 | A | 2/1995 | Graves | |
| 5,395,685 | A | 3/1995 | Seth et al. | |
| 5,397,631 | A | 3/1995 | Green et al. | |
| 5,401,310 | A | 3/1995 | Ture | |
| 5,401,588 | A | 3/1995 | Garvey et al. | |
| 5,411,941 | A | 5/1995 | Grinna et al. | |
| 5,437,722 | A | 8/1995 | Borenstein | |
| 5,462,722 | A | 10/1995 | Liu et al. | |
| 5,466,273 | A | 11/1995 | Connell | |
| 5,468,282 | A | 11/1995 | Yugami et al. | |
| 5,484,653 | A | 1/1996 | Kennedy et al. | |
| 5,496,914 | A | 3/1996 | Wood et al. | |
| 5,500,668 | A | 3/1996 | Malhotra et al. | |
| 5,508,263 | A | 4/1996 | Grinna et al. | |
| 5,520,926 | A | 5/1996 | Ferguson | |
| 5,527,982 | A | 6/1996 | Pal et al. | |
| 5,545,297 | A | 8/1996 | Andersen et al. | |
| 5,549,859 | A | 8/1996 | Andersen et al. | |
| 5,552,187 | A | 9/1996 | Green et al. | |
| 5,614,307 | A | 3/1997 | Andersen et al. | |
| 5,618,627 | A | 4/1997 | Merrifield et al. | |
| 5,624,481 | A | 4/1997 | Gerhardinger et al. | |
| 5,626,668 | A | 5/1997 | Gerhardinger et al. | |
| 5,626,954 | A | 5/1997 | Andersen et al. | |
| 5,631,097 | A | 5/1997 | Andersen et al. | |
| 5,637,362 | A | 6/1997 | Chase et al. | |
| 5,643,510 | A * | 7/1997 | Sucech | 264/40.1 |
| 5,644,880 | A | 7/1997 | Lehnert et al. | |
| 5,648,097 | A | 7/1997 | Nuwayser | |
| 5,654,048 | A | 8/1997 | Andersen et al. | |
| 5,658,624 | A | 8/1997 | Andersen et al. | |
| 5,683,635 | A | 11/1997 | Sucech et al. | |
| 5,695,811 | A | 12/1997 | Andersen et al. | |
| 5,704,179 | A | 1/1998 | Lehnert et al. | |
| 5,705,237 | A | 1/1998 | Andersen et al. | |
| 5,705,242 | A | 1/1998 | Andersen et al. | |
| 5,714,001 | A | 2/1998 | Savoly et al. | |
| 5,714,032 | A | 2/1998 | Ainsley et al. | |
| 5,718,785 | A | 2/1998 | Randall | |
| 5,718,797 | A | 2/1998 | Phillips et al. | |
| 5,744,199 | A * | 4/1998 | Joffre et al. | 427/387 |
| 5,746,822 | A | 5/1998 | Espinoza et al. | |
| 5,749,936 | A | 5/1998 | Humphries et al. | |
| 5,753,163 | A | 5/1998 | Sekhar et al. | |
| 5,759,037 | A | 6/1998 | Fischer | |
| 5,772,846 | A | 6/1998 | Jaffee | |
| 5,776,245 | A | 7/1998 | Thomas | |
| 5,791,109 | A | 8/1998 | Lehnert et al. | |
| 5,797,988 | A | 8/1998 | Linde et al. | |
| 5,798,151 | A | 8/1998 | Andersen et al. | |
| 5,807,567 | A | 9/1998 | Randolph et al. | |
| 5,817,262 | A * | 10/1998 | Englert | 264/86 |
| 5,830,319 | A | 11/1998 | Landin | |
| 5,830,548 | A | 11/1998 | Andersen et al. | |
| 5,837,752 | A | 11/1998 | Shastri et al. | |
| 5,855,667 | A | 1/1999 | Thomas | |
| 5,879,498 | A | 3/1999 | Lemons | |
| 5,882,395 | A | 3/1999 | Linde et al. | |
| 5,883,024 | A | 3/1999 | O'Haver-Smith et al. | |
| 5,908,521 | A | 6/1999 | Ainsley et al. | |
| 5,945,044 | A * | 8/1999 | Kawai et al. | 264/37.29 |
| 5,981,406 | A | 11/1999 | Randall | |
| 6,001,496 | A | 12/1999 | O'Haver-Smith | |
| 6,106,607 | A | 8/2000 | Be et al. | |
| 6,110,575 | A | 8/2000 | Haga | |
| 6,182,407 | B1 | 2/2001 | Turpin et al. | |
| 6,187,697 | B1 | 2/2001 | Jaffee et al. | |
| 6,319,312 | B1 | 11/2001 | Luongo | |
| 6,340,388 | B1 * | 1/2002 | Luongo | 106/675 |
| 6,342,284 | B1 | 1/2002 | Yu et al. | |
| 6,355,099 | B1 | 3/2002 | Immordino et al. | |
| 6,365,533 | B1 | 4/2002 | Horner, Jr. et al. | |
| 6,409,824 | B1 | 6/2002 | Veeramasuneni et al. | |
| 6,432,482 | B1 | 8/2002 | Jaffee et al. | |
| 6,435,369 | B1 | 8/2002 | Poursayadi | |
| 6,443,258 | B1 | 9/2002 | Putt et al. | |
| 6,465,165 | B2 * | 10/2002 | Landry-Coltrain et al. | 430/523 |
| 6,492,450 | B1 | 12/2002 | Hsu | |
| 6,494,609 | B1 | 12/2002 | Wittbold et al. | |
| 6,524,679 | B2 | 2/2003 | Hauber et al. | |
| 6,547,874 | B2 | 4/2003 | Eck et al. | |
| 6,566,434 | B1 | 5/2003 | Mayer et al. | |
| 6,569,541 | B1 | 5/2003 | Martin et al. | |
| 6,632,550 | B1 | 10/2003 | Yu et al. | |
| 6,723,670 | B2 | 4/2004 | Kajander et al. | |
| 6,737,156 | B2 | 5/2004 | Koval et al. | |

| | | |
|---|---|---|
| 6,746,781 B2 | 6/2004 | Francis et al. |
| 6,747,922 B2 | 6/2004 | Kamiyama |
| 6,770,354 B2 | 8/2004 | Randall et al. |
| 6,774,146 B2 | 8/2004 | Savoly et al. |
| 6,800,131 B2 | 10/2004 | Yu et al. |
| 6,800,361 B2 | 10/2004 | Bruce et al. |
| 6,808,793 B2 | 10/2004 | Randall et al. |
| 6,822,033 B2 | 11/2004 | Yu et al. |
| 6,838,163 B2 | 1/2005 | Smith et al. |
| 6,866,492 B2 | 3/2005 | Hauber et al. |
| 6,874,930 B2 | 4/2005 | Wittbold et al. |
| 6,875,308 B2 | 4/2005 | Kajander et al. |
| 6,878,321 B2 | 4/2005 | Hauber et al. |
| 6,902,615 B2 | 6/2005 | Shoshany |
| 6,932,863 B2 | 8/2005 | Shoshany |
| 6,946,504 B2 | 9/2005 | Sinnige |
| 7,056,582 B2 | 6/2006 | Carbo et al. |
| 7,244,304 B2 | 7/2007 | Yu et al. |
| 7,338,702 B2 | 3/2008 | Swales |
| 7,364,676 B2 | 4/2008 | Sucech et al. |
| 7,413,603 B2 | 8/2008 | Miller et al. |
| 7,435,369 B2 | 10/2008 | Hennis et al. |
| 7,803,226 B2 | 9/2010 | Wang et al. |
| 7,811,685 B2 | 10/2010 | Wang et al. |
| 7,815,730 B2 | 10/2010 | Wang et al. |
| 7,892,472 B2 | 2/2011 | Veeramasuneni et al. |
| 2001/0009834 A1 | 7/2001 | Peng et al. |
| 2002/0045074 A1 | 4/2002 | Yu et al. |
| 2002/0151240 A1 | 10/2002 | Smith et al. |
| 2002/0155282 A1 | 10/2002 | Randall et al. |
| 2003/0031854 A1 | 2/2003 | Kajander et al. |
| 2003/0032350 A1 | 2/2003 | Kajander et al. |
| 2003/0054714 A1 | 3/2003 | Peng et al. |
| 2003/0114065 A1 | 6/2003 | Peng et al. |
| 2003/0119408 A1 | 6/2003 | Choi |
| 2003/0129903 A1 | 7/2003 | Moes |
| 2003/0134079 A1 | 7/2003 | Bush et al. |
| 2003/0134554 A1 | 7/2003 | Halm et al. |
| 2003/0139111 A1 | 7/2003 | Kajander et al. |
| 2003/0175478 A1 | 9/2003 | Leclercq |
| 2003/0203191 A1 | 10/2003 | Randall et al. |
| 2003/0211305 A1 | 11/2003 | Koval et al. |
| 2004/0033749 A1 | 2/2004 | Smith et al. |
| 2004/0043682 A1 | 3/2004 | Taylor et al. |
| 2004/0083927 A1 | 5/2004 | Shoshany |
| 2004/0083928 A1 | 5/2004 | Shoshany |
| 2004/0142618 A1 | 7/2004 | Porter |
| 2004/0166751 A1 | 8/2004 | Peng et al. |
| 2004/0198116 A1 | 10/2004 | Peng et al. |
| 2004/0209074 A1 | 10/2004 | Randall et al. |
| 2004/0231916 A1 | 11/2004 | Englert et al. |
| 2004/0266303 A1 | 12/2004 | Jaffee |
| 2004/0266304 A1 | 12/2004 | Jaffee |
| 2005/0019618 A1 | 1/2005 | Yu et al. |
| 2005/0070186 A1 | 3/2005 | Shoemake et al. |
| 2005/0103262 A1 | 5/2005 | Bush et al. |
| 2005/0112977 A1 | 5/2005 | Choi |
| 2005/0136241 A1 | 6/2005 | Kajander et al. |
| 2005/0142348 A1 | 6/2005 | Kajander et al. |
| 2005/0181693 A1 | 8/2005 | Kajander |
| 2005/0202223 A1 | 9/2005 | Harima et al. |
| 2005/0202258 A1 | 9/2005 | Swales et al. |
| 2005/0202742 A1 | 9/2005 | Smith et al. |
| 2005/0221705 A1 | 10/2005 | Hitch |
| 2005/0233657 A1 | 10/2005 | Grove et al. |
| 2005/0266225 A1* | 12/2005 | Currier et al. ............... 428/297.4 |
| 2006/0010786 A1 | 1/2006 | Rogers |
| 2006/0035112 A1 | 2/2006 | Veeramasuneni et al. |
| 2006/0272764 A1 | 12/2006 | Smith |
| 2007/0022913 A1 | 2/2007 | Wang et al. |
| 2007/0026578 A1 | 2/2007 | Kim et al. |
| 2007/0056478 A1 | 3/2007 | Miller et al. |
| 2007/0148430 A1 | 6/2007 | Agrawal |
| 2008/0003903 A1 | 1/2008 | Nandi |
| 2008/0057318 A1 | 3/2008 | Adzima et al. |
| 2008/0176050 A1 | 7/2008 | Lintz et al. |
| 2008/0190062 A1 | 8/2008 | Engbrecht et al. |
| 2009/0011207 A1 | 1/2009 | Dubey |
| 2009/0186549 A1 | 7/2009 | Bennett |
| 2009/0239087 A1 | 9/2009 | Wang et al. |
| 2010/0055477 A1 | 3/2010 | Wang et al. |

FOREIGN PATENT DOCUMENTS

| | | |
|---|---|---|
| CA | 993779 | 7/1976 |
| CA | 2116443 A1 | 3/1993 |
| DE | 7806114 U1 | 3/1978 |
| DE | 2808723 A1 | 9/1979 |
| DE | 3135865 A1 | 3/1983 |
| DE | 3508933 A1 | 10/1986 |
| DE | 198 53 450 A1 | 5/2000 |
| EP | 0154094 A2 | 9/1985 |
| EP | 0 681 998 A1 | 11/1995 |
| EP | 1 801 278 A1 | 6/2007 |
| EP | 1801278 | 6/2007 |
| GB | 585627 A | 2/1947 |
| GB | 672829 A | 5/1952 |
| GB | 735405 A | 8/1955 |
| GB | 736257 | 9/1955 |
| GB | 772581 | 4/1957 |
| GB | 833800 | 4/1960 |
| GB | 873805 | 7/1961 |
| GB | 1064462 | 4/1967 |
| GB | 1170079 | 11/1969 |
| GB | 1197221 | 7/1970 |
| GB | 1250713 A | 10/1971 |
| GB | 1498030 | 1/1978 |
| GB | 2004807 A | 4/1979 |
| GB | 2007153 A | 5/1979 |
| GB | 2013563 A | 8/1979 |
| GB | 2023687 A | 1/1980 |
| GB | 1581396 A | 12/1980 |
| GB | 2053779 A | 2/1981 |
| GB | 2141456 A | 12/1984 |
| GB | 2142674 A | 1/1985 |
| GB | 2433497 | 6/2007 |
| JP | 53-135125 A | 11/1978 |
| JP | 07-330410 | 12/1995 |
| JP | 07-330411 A | 12/1995 |
| JP | 08-232442 A | 9/1996 |
| JP | 11-300882 A | 11/1999 |
| NZ | 155679 A | 12/1971 |
| RU | 2044714 C1 | 9/1995 |
| RU | 2058955 C1 | 4/1996 |
| RU | 94030472 A1 | 6/1996 |
| RU | 09-142915 D1 | 3/1997 |
| RU | 2210553 C2 | 8/2003 |
| SU | 967984 A | 10/1982 |
| SU | 1052492 A | 11/1983 |
| WO | WO 80/02086 A1 | 10/1980 |
| WO | 93/004009 A1 | 3/1993 |
| WO | WO93/04009 A1 | 3/1993 |
| WO | WO 99/08979 | 2/1999 |
| WO | WO 00/06518 | 2/2000 |
| WO | WO 01/45932 A1 | 6/2001 |
| WO | WO0153075 A1 | 7/2001 |
| WO | WO 2007005041 | 1/2007 |
| WO | WO 2007009935 | 1/2007 |
| WO | WO 2008066746 | 6/2008 |

OTHER PUBLICATIONS

Hannant, D.J. et al.; Polyolefin Fibrous Networks in Cement Matrices for Low Cost Sheeting; Phil. Trans. R. Soc. Land; 1980; pp. 591-597; A 294; Civil Engineering Department Univ. of Surrey, Guildford, Surrey GU2 5XH, U.K.

Karni, J.; Thin Gypsum Panels; Materiaux et Constructions; 1980; pp. 383-389; vol. 13, No. 77; Bordas-Dunod; Israel.

Salyer, Ivan O et al.; Utilization of Bagasse in New Composite Building Materials; Ind. Eng. Chem. Prod. Res. Dev. 1982; pp. 17-23; 21; Center for Basic and Applied Polymer Research, Univ. of Dayton, OH 45469.

Weber, Charles, G.; Fiber Building Boards Their Manufacture and Use; Industrial and Engineering Chemistry; Aug. 1935; pp. 896-898; vol. 27, No. 8; National Bureau of Standards, Washington, D.C.

Van Wazer, Phosphorus and Its Compounds, vol. 1, Interscience Publishers, Inc., New York (1958), pp. 419-427 and pp. 6799-6695.

International Search Report from PCT/US2009/062540, published as WO 2010/051364 A1 on May 6, 2010.
International Search Report from PCT/US2008/070787, published as WO 2009/015156 A3 on Apr. 9, 2009.
International Search Report from PCT/US2008/053304, published as WO 2008/100777 A3 on Nov. 13, 2008.
International Search Report from PCT/US2010/027401, published as WO 2010/117563 A1 on Oct. 14, 2010.
International Search Report from PCT/US2006/021793, published as WO 2007/018705 A3 on Aug. 7, 2008.
International Search Report from PCT/US2005/026345, published as WO 2006/020369 A3 on Jul. 5, 2007.
English translation of RU 94030472 A1, Applicant Vaker-Khemi GmbKh, published on Jun. 20, 1996.

* cited by examiner

WATER RESISTANT CEMENTITIOUS ARTICLE AND METHOD FOR PREPARING SAME

CROSS-REFERENCE TO RELATED APPLICATIONS

This patent application claims the benefit of U.S. Provisional Patent Application No. 60/889,487, filed Feb. 12, 2007, the entire disclosure of which is hereby incorporated by reference.

BACKGROUND OF THE INVENTION

Cementitious articles, such as gypsum board and cement board, are useful in a variety of applications, some of which require a degree of water resistance. Traditional paper-faced cementitious articles do not always perform well under high moisture conditions, or upon exposure to the outdoors. Thus, for such applications, it is often desirable to use a cementitious article that is faced with a glass or polymer-based fiber mat instead of paper. It also is advantageous to use additives in the cementitious core that improve the water resistance of the core material itself.

The manufacturing process of cementitious articles, such as gypsum board and cement board, typically involves depositing a cementitious slurry over a first facing material and covering the wet slurry with a second facing material of the same type, such that the cementitious slurry is sandwiched between the two facing materials. Thereafter, excess water is removed from the slurry by drying. The cementitious slurry is allowed to harden to produce a solid article prior to final drying.

The manufacturing process of cementitious articles, thus, often requires the facing material to be sufficiently permeable that excess water can be removed from the cementitious slurry in the drying process. For example, non-woven fiberglass mat is often used as a facing material, in which the space between the fibers provides permeability. The permeability of the fibrous facing materials, however, makes the manufacturing process more difficult because the cementitious slurry deposited on the fibrous mat facing material tends to penetrate the mat causing slurry build-up on the forming table and assembly line. The slurry build-up must be removed periodically. Increasing the viscosity of the slurry can reduce the amount of slurry that penetrates the fibrous mat facing material, but the required higher viscosity is not always optimum for use in existing plant production processes due, for instance, to changes in mixing, setting, drying, or hardening characteristics.

Furthermore, the permeability of the fibrous mat facing material also reduces the water-resistance of the cementitious article because it allows water to penetrate the mat and contact the cementitious core during use. In order to alleviate this problem, exterior coatings of hydrophobic resins are sometimes applied. However, this generally requires an additional post-manufacturing step to be employed, adding cost and inconvenience.

Another approach is to further increase the water resistance of the cementitious core material by including hydrophobic additives in the cementitious slurry. A preferred additive for this purpose is a siloxane oil. However, methods of employing such additives require further improvement in their implementation and effectiveness.

Thus, there remains a desire for new water resistant cementitious articles, as well as methods of preparing such articles.

BRIEF SUMMARY OF THE INVENTION

In one aspect, the invention provides a fibrous mat-faced cementitious article comprising (a) a cementitious core, and (b) a first fibrous mat comprising polymer or mineral fibers and a hydrophobic finish on at least one surface thereof, wherein the hydrophobic finish is in contact with the cementitious core.

In another aspect, the invention provides a method of preparing a fibrous mat-faced cementitious article comprising (a) depositing a cementitious slurry on a first fibrous mat comprising polymer or mineral fibers and a hydrophobic finish on at least one surface thereof, wherein the cementitious slurry is deposited on the hydrophobic finish, and (b) allowing the cementitious slurry to harden, thereby providing a fibrous mat-faced cementitious article.

In another aspect, the invention provides a method of preparing a water-resistant cementitious article comprising (a) preparing an aqueous siloxane dispersion comprising about 4 wt. % to about 8 wt. % siloxane in water, (b) combining the siloxane dispersion with a cementitious mixture to provide a cementitious slurry, (c) depositing the cementitious slurry onto a substrate, and (d) allowing the cementitious slurry to harden, thereby providing a cementitious article.

These and other advantages of the present invention, as well as additional inventive features, will be apparent from the description of the invention provided herein.

DETAILED DESCRIPTION OF THE INVENTION

Embodiments of a fibrous mat-faced cementitious article according to the invention comprise (a) a cementitious core, and (b) a first fibrous mat comprising polymer or mineral fibers and a hydrophobic finish on at least one surface thereof, wherein the hydrophobic finish is in contact with the cementitious core. Desirably, the hydrophobic finish prevents the cementitious core of the article from penetrating the first fibrous mat to any substantial degree during manufacture.

The first fibrous mat comprises any suitable type of polymer or mineral fiber, or combination thereof. Non-limiting examples of suitable fibers include glass fibers, polyamide fibers, polyaramide fibers, polypropylene fibers, polyester fibers (e.g., polyethylene teraphthalate (PET)), polyvinyl alcohol (PVOH), polyvinyl acetate (PVAc), cellulosic fibers (e.g., cotton, rayon, etc.), and the like, as well as combinations thereof. Furthermore, the fibers of the mat can be hydrophobic or hydrophilic, coated or uncoated. Of course, the choice of fibers will depend, in part, on the type of application in which the cementitious article is to be used. For example, when the cementitious article is used for applications that require heat or fire resistance, appropriate heat or fire resistant fibers should be used in the fibrous mat.

The first fibrous mat can be woven or non-woven; however, non-woven mats are preferred. Non-woven mats comprise fibers bound together by a binder. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and the like, as well as combinations thereof. Suitable fibrous mats include commercially available mats used as facing materials for cementitious articles.

The first fibrous mat of the cementitious article comprises a hydrophobic finish on at least one surface thereof, which is in contact with the cementitious core. Any hydrophobic finish material can be used. Preferably, the hydrophobic finish provides a surface with a degree of hydrophobicity such that water applied to the surface exhibits a contact angle of about 70° or greater, such as about 70° to about 130°, or about 90° or greater, such as about 90° to about 120°. The contact angle can be measured by any suitable technique.

Examples of suitable hydrophobic finish materials include, without limitation, compositions comprising, consisting essentially of, or consisting of talc, wax, silicone-based compounds (e.g., silanes or siloxanes), hydrophobic resins, fatty acids (e.g., oleic acid) and salts (e.g., multivalent salts) thereof, polyethylene glycol (PEG), and long-chain hydrocarbon and fluorocarbon surfactants (e.g., having 12 or more carbon atoms), as well as combinations thereof.

The finish material can be applied to the first fibrous mat as a liquid or solid material (e.g., resin, wet-dispersed powder, dry powder, or film) by any of various methods known in the art. For instance, the hydrophobic finish materials can be applied by brushing, spraying, rolling, pouring, dipping, sifting, or overlaying the hydrophobic finish material. Solid materials, such as powders, can be dispersed prior to application using any common solvent (e.g, water, alcohols, etc.) or dispersant, provided the solvent or dispersant does not react adversely with the fibrous mat materials. Solvents that etch the surface fibers of the fibrous mat, and thereby enhance the ability of the finish material to adhere to the mat, also can be used. Preferably, any solvent or dispersant used is easily dried and does not leave a residue that prevents the finish from adhering to the fibrous mat. Liquid or dispersed finish materials can have any viscosity suitable for application to the fibrous mat. Typically, the viscosity of a liquid or dispersed finish material will be from about 50-200 Kreb's units (KU) (about 300-20,000 cP), such as about 80-150 KU (about 800-8,000 cP).

Recognizing that the surface of the fibrous mat is an irregular surface, the finish material need not provide a finish that is completely continuous. When a liquid or powder finish composition is used, for instance, the finish material may fall within the voids between the fibers of the mat leaving gaps or holes in the finish. However, the finish material preferably is applied in an amount sufficient to provide a finish that is continuous and, desirably, coextensive with the dimensions of the first fibrous mat.

The hydrophobic finish applied to the first fibrous mat is preferably in the form of a layer. The layer, desirably, is thick enough to slow or prevent the penetration of cementitious slurry through the first fibrous mat during production. Without wishing to be bound by any particular theory, it is believed that the hydrophobic layer slows or prevents slurry penetration due to the reduced surface tension of the cementitious slurry on the hydrophobic layer as compared to the fibrous mat in the absence of the hydrophobic layer and/or by physically blocking the pore space of the fibrous mat. Generally, the finish will provide a layer over the mat (and over any resinous binder used to bind the fibers of the mat) with an average thickness of at least about 25 microns (e.g., at least about 25 to about 500 microns), at least about 100 microns (e.g., about 100 to about 500 microns), or at least about 200 microns (e.g., about 200 to about 500 microns, or about 200 to about 400 microns), or even at least about 300 microns (e.g., about 300 to about 500 microns, or about 300 to about 400 microns).

According to a preferred aspect of the invention, the first fibrous mat is not substantially embedded in the cementitious core. Preferably, less than about 50% of the thickness of the mat is embedded in the cementitious core, more preferably less than about 30%, less than about 15%, less than about 10%, or even less than about 2% (e.g., less than about 1%) of the thickness of the mat is embedded in the cementitious core. Without wishing to be bound by any particular theory, it is believed that the hydrophobic finish of the first fibrous mat prevents, to at least some degree, the first fibrous mat from becoming embedded in the cementitious core during production. In a related and preferred aspect of the invention, the cementitious core adheres, at least in part, to the hydrophobic finish.

It will be appreciated that the first fibrous mat has two facing surfaces: an outwardly facing surface and a surface facing the cementitious core. In accordance with the invention, the surface of the first fibrous mat facing the cementitious core comprises a hydrophobic finish. The outwardly facing surface need not comprise a hydrophobic finish. However, according to one embodiment of the invention, the outwardly facing surface of the fibrous mat also can comprise a hydrophobic finish as described herein. Alternatively, the outwardly facing surface can be otherwise treated by any method known in the art, or can remain untreated.

The cementitious article optionally can comprise a second fibrous mat comprising polymer or mineral fibers, wherein the cementitious core is disposed between the first fibrous mat and the second fibrous mat. The second fibrous mat can be the same or different from the first fibrous mat. Furthermore, the second fibrous mat can comprise a hydrophobic finish as described herein, or can be free of such a finish. When the cementitious article is in the form of a board or panel (e.g., gypsum board, cement board, etc.), the second fibrous mat is preferably the same as the first fibrous mat, both in material and orientation relative to the cementitious core, or has sufficiently similar expansion and contraction properties to the first fibrous mat, such that warping of the cementitious article is reduced or eliminated. When the second fibrous mat is the same as the first fibrous mat, it should be understood that the first and second fibrous mats can be provided by a single continuous piece of material, for example, by folding a single piece of fibrous mat such that it wraps around the cementitious core.

The cementitious core can comprise any material, substance, or composition containing or derived from hydraulic cement, along with any suitable additives. Non-limiting examples of materials that can be used in the cementitious core include Portland cement, sorrel cement, slag cement, fly ash cement, calcium alumina cement, water-soluble calcium sulfate anhydrite, calcium sulfate α-hemihydrate, calcium sulfate β-hemihydrate, natural, synthetic or chemically modified calcium sulfate hemihydrates, calcium sulfate dihydrate ("gypsum," "set gypsum," or "hydrated gypsum"), and mixtures thereof. As used herein, the term "calcium sulfate material" refers to any of the forms of calcium sulfate referenced above.

The additives can be any additives commonly used to produce cementitious articles, such as gypsum board or cement board. Such additives include, without limitation, structural additives such as mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, and the like. Examples of the use of some of these and other additives are described, for instance, in U.S. Pat. Nos. 6,342,284, 6,632,550, 6,800, 131, 5,643,510, 5,714,001, and 6,774,146, and U.S. Patent Publications 2004/0231916 A1, 2002/0045074 A1 and 2005/0019618 A1.

Preferably, the cementitious core comprises a calcium sulfate material, Portland cement, or mixture thereof. Advantageously, the cementitious core also comprises a hydrophobic agent, such as a silicone-based material (e.g., a silane, siloxane, or silicone-resin matrix), in a suitable amount to improve the water resistance of the core material. It is also preferred that the cementitious core comprise a siloxane catalyst, such as magnesium oxide (e.g., dead burned magnesium oxide), fly ash (e.g., Class C fly ash), or a mixture thereof. The siloxane and siloxane catalyst can be added in any suitable amount, and by any suitable method as described herein with respect the method of preparing a water-resistant cementitious article of the invention, or as described, for example, in U.S. Patent Publications 2006/0035112 A1 or 2007/0022913 A1. Desirably, the cementitious core also comprises strength-improving additives, such as phosphates (e.g., polyphosphates as described in U.S. Pat. Nos. 6,342,284, 6,632,550, and 6,800,131 and U.S. Patent Publications 2002/0045074 A1, 2005/0019618 A1, and 2007/0022913 A1) and/or pre-blended unstable and stable soaps (e.g., as described in U.S. Pat. Nos. 5,683,635 and 5,643,510). The cementitious core can comprise paper or glass fibers, but is preferably substantially free of paper and/or glass fibers (e.g., comprises less than about 1 wt. %, less than about 0.5 wt. %, less than about 0.1 wt. %, or even less than about 0.05 wt. % of paper and/or glass fibers, or contains no such fibers).

The cementitious article can be any of any type or shape suitable for a desired application. Non-limiting examples of cementitious articles include gypsum panels and cement panels of any size and shape.

The cementitious article can be prepared by any suitable method including, but not limited to, the inventive methods described herein. Embodiments of a method of preparing a fibrous mat-faced cementitious article according to the invention comprise (a) depositing a cementitious slurry on a first fibrous mat comprising polymer or mineral fibers, wherein the first fibrous mat comprises a hydrophobic finish on at least one surface thereof, and the cementitious slurry is deposited on the hydrophobic finish, and (b) allowing the cementitious slurry to harden, thereby providing a fibrous mat-faced cementitious article.

The method of preparing a cementitious article in accordance with the invention can be conducted on existing gypsum board manufacturing lines used to make fibrous mat-faced cementitious articles known in the art. Briefly, the process typically involves discharging a fibrous mat material onto a conveyor, or onto a forming table that rests on a conveyer, which is then positioned under the discharge conduit (e.g., a gate-canister-boot arrangement as known in the art, or an arrangement as described in U.S. Pat. Nos. 6,494,609 and 6,874,930) of a mixer. The components of the cementitious slurry are fed to the mixer comprising the discharge conduit, where they are agitated to form the cementitious slurry. Foam can be added in the discharge conduit (e.g., in the gate as described, for example, in U.S. Pat. Nos. 5,683,635 and 6,494,609). The cementitious slurry is discharged onto the fibrous mat facing material. The slurry is spread, as necessary, over the fibrous mat facing material and optionally covered with a second facing material, which may be a fibrous mat or other type of facing material (e.g., paper, foil, plastic, etc.). The wet cementitious assembly thereby provided is conveyed to a forming station where the article is sized to a desired thickness, and to one or more knife sections where it is cut to a desired length to provide a cementitious article. The cementitious article is allowed to harden, and, optionally, excess water is removed using a drying process (e.g., by air-drying or transporting the cementitious article through a kiln). Each of the above steps, as well as processes and equipment for performing such steps, are known in the art. It also is common in the manufacture of cementitious articles such as gypsum and cement board to deposit a relatively dense layer of slurry onto a facing material before depositing the primary slurry, and to use vibration in order to eliminate large voids or air pockets from the deposited slurry. Also, hard edges, as known in the art, are sometimes used. These steps or elements (dense slurry layer, vibration, and/or hard edges) optionally can be used in conjunction with the invention.

All aspects of the first fibrous mat used in accordance with the method of preparing a cementitious article are as described herein with respect to the cementitious article of the invention.

Although the cementitious slurry is in contact with the hydrophobic finish of the first fibrous mat, the cementitious slurry preferably does not substantially penetrate the first fibrous mat, thereby preventing the first fibrous mat from embedding in the cementitious slurry to any substantial degree. Preferably, the cementitious slurry penetrates less than about 50% of the thickness of the mat, more preferably less than about 30%, less than about 15%, less than about 10%, or even less than about 2% (e.g., less than about 1%) of the thickness of the mat. Most preferably, the cementitious slurry does not penetrate at all beyond the hydrophobic finish on the mat. According to a related and preferred aspect of the invention, the cementitious slurry preferably adheres, at least in part, to the hydrophobic finish.

The hydrophobic finish can be applied to the first fibrous mat prior to delivering the first fibrous mat to the manufacturing line. Alternatively, the hydrophobic finish can be applied to the first fibrous mat on the manufacturing line. In this respect, the method of the invention can further comprise depositing a hydrophobic finish on the first fibrous mat before depositing the cementitious slurry on the first fibrous mat. Any suitable hydrophobic finish material can be used, as previously described herein. The hydrophobic finish can be deposited on the first fibrous mat by any of various techniques known in the art, such as by brushing, spraying, rolling, pouring, dipping, sifting, or overlaying the hydrophobic finish material.

The hydrophobic finish, when applied as a liquid, preferably is dried before depositing the cementitious slurry on the first fibrous mat. The hydrophobic finish can be dried by any suitable method, such as by applying heat to the finish or to the mat comprising the finish.

Optionally, the method of preparing a fibrous mat-faced cementitious article can further comprise contacting the cementitious slurry with a second fibrous mat prior to allowing the cementitious slurry to harden, wherein the cementitious slurry is disposed between the first fibrous mat and the second fibrous mat. All other aspects of the first and second fibrous mats are as described with respect to the cementitious article of the invention.

The cementitious slurry comprises any of the cementitious materials and additives previously described as suitable or preferred with respect to the cementitious core of the cementitious article, along with sufficient water to provide a suitable viscosity. When measured by the slump test, the cementitious slurry will typically produce a patty with a diameter of about 5" to about 8" (or about 10 cm to about 20 cm), such as about 6" to about 7" (or about 15 cm to about 18 cm). Procedures for measuring the viscosity of a slurry using the slump test are known in the art. Briefly, a 2" (or 5 cm) diameter tube is filled with slurry to a height of 4" (10 cm). Within 5 seconds from sampling the slurry from the manufacturing line, the slurry is released from the tube onto a flat, level surface and allowed to spread into a patty. When the slurry has stopped spreading, the widest diameter of the slurry patty is measured (in the case of non-circular (e.g., elliptical) slurry patty, the widest diameter of the slurry patty is averaged with the diameter of the slurry patty in the direction perpendicular to the widest diameter).

Other aspects of the method of preparing a fibrous mat-faced cementitious article are as described herein with respect to the cementitious article of the invention. Those aspects of the method of preparing a fibrous mat-faced cementitious article not specifically described herein can be supplied by the techniques known and used in the manufacture of conventional cementitious articles, especially fibrous mat-faced cementitious articles.

In a related aspect, the invention provides a method of preparing a water resistant cementitious article comprising (a) preparing an aqueous siloxane dispersion comprising about 4 wt. % to about 8 wt. % siloxane in water, (b) combining the siloxane dispersion with a cementitious mixture to provide a cementitious slurry, (c) depositing the cementitious slurry onto a facing or other type of substrate, and (d) allowing the cementitious slurry to harden, thereby providing a cementitious article.

Any siloxane suitable for conferring water-resistance to a cementitious mixture can be used. The siloxane can be a cyclic hydrogen-modified siloxane or, preferably, a linear hydrogen-modified siloxane. The siloxane is desirably a liquid (e.g., a siloxane oil). Typically, the linear hydrogen modified siloxanes useful in the practice of the present invention comprise those having a repeating unit of the general formula: —Si(H)(R)—O—, wherein R represents a saturated or unsaturated mono-valent hydrocarbon radical. In preferred embodiments, R represents an alkyl group and most preferably R is a methyl group. Preferred siloxanes are capable of forming highly cross-linked silicone resins. During polymerization, the terminal groups are removed by condensation and siloxane groups are linked together to form the silicone resin. Cross-linking of the chains also occurs. The resulting silicone resin imparts water resistance to the gypsum matrix as it forms. Suitable such siloxanes are commercially available and described in the patent literature (e.g., low solvent or solventless methyl hydrogen siloxane fluid sold under the name SILRES BS 94 by Wacker-Chemie GmbH (Munich, Germany)).

The siloxane dispersion preferably is prepared by introducing the siloxane and water into a mixer in an amount sufficient to provide a dispersion comprising about 4 wt. % to about 8 wt. % siloxane in water, preferably about 4 wt. % to about 5 wt. % siloxane in water, and processing the mixture to produce a dispersion. More preferably, the dispersion comprises more than 4 wt. % and/or less than 8 wt. % siloxane in water. By way of illustration, the dispersion can comprise from about 4.1 wt. %, 4.2 wt. %, 4.3 wt. %, 4.4 wt. % or 4.5 wt. % to about 5 wt. %, 6 wt. %, or 7 wt. % siloxane in water. Preferably, the dispersion comprises droplets of siloxane in water, wherein the droplets have an average particle size of about 50 microns or less, preferably about 30 microns or less, or even about 20 microns or less (e.g., about 10 microns or less). More preferably, the droplets have a particle size distribution such that about 75% or more, 80% or more, 85% or more, even 90% or more, or even 95% or more of the droplets have a particle size of about 50 microns or less, preferably about 30 microns or less, or even about 20 microns or less (e.g., about 10 microns or less). The particle size and particle size distribution of the siloxane droplets in the dispersion can be determined using routine techniques, such as by dynamic light scattering analysis.

According to a preferred aspect of the invention, the dispersion is stabilized, such that the siloxane droplets remain dispersed in the water (i.e., the siloxane phase does not substantially separate from the water phase) for a period of time sufficient to allow the dispersion to be combined with the other components of the cementitious core. For instance, according to a preferred aspect of the invention, the dispersion will have a stability such that a sample of the dispersion taken immediately after mixing and allowed to rest will exhibit no visible coalescing of droplets on the surface of the sample within one minute (e.g., within two minutes).

A high shear or ultra-high shear mixer is, desirably, used to disperse the siloxane in the water. The high shear or ultra-high shear mixer can be any mixer capable of producing a siloxane in water dispersion in which the siloxane droplets have the above-described particle size or particle size distribution characteristics. Suitable types of high shear mixers include mechanical-shear mixers, such as pin-type, blade-type, rotor-stator, and disc-type mixers, as well as hydraulic shear mixers. Preferred mixers are those capable of producing a tip-speed of about 9,000 to about 15,000 feet per minute (FPM) (or about 40 to about 80 meters per second (mps), such as about 10,000 to 12,000 FPM (or about 50 to about 60 mps). Non-limiting examples of high shear mixers that can be used include the 312/45 MS high shear mixer (20 hp, 3600 RPM) manufactured by Silverson Machines, Inc., East Longmeadow, Mass., and the X-Series Mixer emulsifiers (30 to 75 HP), such as ME-430XS-6, ME-440XS-9, ME-475XS-12, HSM709X-40, HMS712X-75 manufactured by Charles Ross & Son Company, Hauppauge, N.Y.

The siloxane and water can be introduced into the dispersing mixer, preferably high shear mixer, separately or together, simultaneously or sequentially in any order. When the dispersion is prepared by batch mixing, the water is preferably added prior to the siloxane. However, batch mixing generally is not convenient or economical for continuous production methods. Thus, an in-line dispersing mixer is preferably used so as to produce the dispersion in a continuous manner, in which case the siloxane and water can be supplied to the in-line dispersing mixer continuously and simultaneously in an appropriate ratio. The aqueous siloxane dispersion preferably does not comprise an emulsifier or dispersant.

The aqueous sitoxane dispersion is combined with a cementitious mixture to provide a cementitious slurry. Those of ordinary skill in the art will appreciate that the cementitious mixture comprises solid components and liquid components. By way of illustration, the siloxane dispersion comprising the above-described amount of siloxane in water can be introduced directly into the mixer (e.g., the board mixer) comprising the solid components and/or liquid components of the cementitious mixture. Preferably, however, the siloxane dispersion is first combined with a liquid component of the cementitious mixture (e.g., water), and subsequently combined with the solid components of the cementitious mixture (e.g., by adding the siloxane dispersion to the gauging water or other water that is subsequently delivered to the board mixer). The siloxane dispersion is preferably added to the cementitious mixture in an amount sufficient to provide a siloxane content in the final cementitious product of about 0.3 wt. % to about 2 wt. %, such as about 0.5 wt. % to about 1.5 wt. %, or about 0.6 wt. % to about 1 wt. % based on the weight of the final cementitious product (e.g., the hardened, dried cementitious product). For example, assuming a cementitious panel of 1500 lbs/msf (e.g., a standard ½" gypsum panel), the siloxane dispersion can be added to the cementitious mixture in an amount sufficient to provide about 5 lbs siloxane/1000 sq. ft. to about 30 lbs siloxane/1000 sq. ft. (or about 20 g siloxane/$m^2$ to about 150 g siloxane/$m^2$), such as about 7 lbs siloxane/1000 sq. ft. to about 20 lbs siloxane/1000 sq. ft. (or about 30 g siloxane/$m^2$ to about 100 g siloxane/$m^2$), or even about 10 lbs siloxane/1000 sq. ft. to about 14 lbs siloxane/1000 sq. ft. (or about 50 g siloxane/$m^2$ to about 70 g siloxane/$m^2$) in the final cementitious product (e.g., the hardened, dried cementitious product).

The cementitious slurry optionally comprises a siloxane catalyst, such as fly ash, especially class C fly ash, magnesium oxide, especially dead burned magnesium oxide, or, most preferably, a combination thereof. The fly ash is preferably used in amounts of about 0.1% to about 5% based on the weight of the dry cementitious component (e.g., the dry weight of the stucco). The magnesium oxide is preferably used in amounts of about 0.1% to about 0.5% based on the weight of the dry cementitious component (e.g., the dry weight of the stucco). The ratio of fly ash to magnesium oxide is desirably from about 2:1 to about 3:1.

Other aspects of the cementitious slurry are as previously described with respect to the method of preparing a mat-faced cementitious article in accordance with the invention. Other aspects of preparing an aqueous siloxane emulsion and combining the emulsion with a cementitious slurry are as described in U.S. Patent Publication 2007/0022913 A1.

The cementitious slurry can be deposited onto a substrate in accordance with known methods and on existing manufacturing lines, as described herein with respect to the method of preparing a fibrous mat-faced cementitious article, provided that a fibrous mat facing material need not be used as a substrate. Rather, the substrate can be any suitable substrate, such as any facing material typically used to face cementitious articles (e.g., paper facing material). Preferably, however, the substrate is a fibrous mat facing material comprising polymer or mineral fibers.

It is especially advantageous, to employ as the substrate a first fibrous mat comprising polymer or mineral fibers, wherein the first fibrous mat comprises a hydrophobic finish on at least one surface thereof. It is further preferable, when such a substrate is used, to deposit the slurry on the hydrophobic finish of the fibrous mat. Furthermore, a first and second fibrous mats can advantageously be used, wherein the cementitious slurry is disposed between the fibrous mats. Suitable such fibrous mats, hydrophobic finishes, and methods for the use thereof to provide a cementitious article, are as described herein with respect to the fibrous mat-faced cementitious article and method for preparing a fibrous mat-faced cementitious article of the invention.

All other aspects of the method of preparing a water-resistant cementitious article are as described herein with respect to the fibrous mat-faced cementitious article or the method of preparing a mat-faced cementitious article. Aspects of the method of preparing water-resistant cementitious article not specifically described herein can be supplied by the techniques known and used in the manufacture of conventional cementitious articles, especially fibrous mat-faced cementitious articles.

EXAMPLE 1

The following example illustrates the preparation of a fibrous-mat faced cementitious article in accordance with the invention.

Two types of fibrous mats are prepared: a first mat comprising all glass fibers and a second mat comprising a blend of 85 wt. % glass fibers and 15 wt. % polyester fibers. Both mats are non-woven and comprised a 19 wt. % melamine formaldehyde/acrylic binder.

A cementitious slurry is prepared using the formulation provided in Table 1 in a board mixer. The siloxane component of the slurry is dispersed in water (e.g., 4.1-4.4 wt. % siloxane in water dispersion) using a high shear mixer (e.g., the 312/45 MS high shear mixer (20 hp, 3600 rpm) manufactured by Silverson Machines, Inc., East Longmeadow, Mass., and the X-Series Mixer emulsifiers (60 Hz, 3,600 rpm) manufactured by Charles Ross & Son Company, Hauppauge, N.Y.), and introduced into the gauging water used to prepare the slurry.

The fibrous mat is positioned for application to the face (formed down) and the back (formed up) of the cementitious panel. The mat is passed through a tensioning and alignment system, and the face mat is creased to form the desired thickness (e.g, ⅝") and desired edge (e.g., square) at the desired board width (e.g., 48"). Preferably, a hydrophobic finish is applied to the face mat. The face mat is passed under the board mixer, and the cementitious slurry is deposited onto the face mat. A densified layer is not deposited prior to depositing the cementitious slurry, and any slurry vibration apparatuses are turned off to help reduce slurry penetration through the mat.

TABLE 1

| Component | Average |
|---|---|
| Stucco | 2140.6 lbs./MSF (10500 g/$m^2$) |
| Gauging water + siloxane water + siloxane | 826.6 lbs./MSF (4050 g/$m^2$) |
| Siloxane water | 255.0 lbs./MSF (1250 g/$m^2$) |
| Siloxane | 11.27 lbs./MSF (55 g/$m^2$) |
| MgO | 1.00 lbs./MSF (5 g/$m^2$) |
| Flyash | 8.00 lbs./MSF (40 g/$m^2$) |
| Foam water | 95.85 lbs./MSF (470 g/$m^2$) |
| Foam air | 14.35 cu. ft./MSF (0.044 km$^3$/$m^2$) |
| Soap - Pre-blended 90% unstable to 10% stable soap (Hyonic 25 FM - from GEO Specialty Chemicals) | 0.459 lbs./MSF (2.3 g/$m^2$) |
| Ground gypsum accelerator (5 wt. % sugar) | 6.76 lbs./MSF (11 g/$m^2$) |
| Sodium trimetaphosphate | 0.77 lbs./MSF (3.7 g/$m^2$) |
| Thickness | 0.63 inches (1.6 cm) |
| Dispersant | 10.17 lbs./MSF (50 g/$m^2$) |
| Fiber (paper and/or glass) | 0.00 lbs./MSF |
| Glass water | 465.0 lbs./MSF (2280 g/$m^2$) |
| Total water | 1393.1 lbs./MSF (6825 g/$m^2$) |
| WSR (Water Stucco Ratio) | 65.1% |

The creased face mat with the slurry in-place is formed into an envelope and passed under the forming plate. At the point where the formed face mat enteres the forming plate, the back mat is placed in contact with the edges of the face mat. A bead of synthetic adhesive is used to bond the face glass mat to the back glass mat at the point where the mats intersected. Slurry does not contact the face and back glass mats at this intersection.

The completed glass mat envelope, filled with slurry, exits the forming plate and is transferred to the board belt. Guides keep the edges in the proper position until the slurry hydrates at a point about 30 seconds down the board belt, at which point the edges are self-supporting. The board is moved further down the line until it becomes self supporting. Thereafter, the board is cut to slightly longer than its desired finished length with a board knife. The board is inverted and moved into the kiln to remove the excess water.

The resulting product is a fibrous mat-faced cementitious product with improved water resistance.

EXAMPLE 2

The following example illustrates the effectiveness of a hydrophobic finish material applied to a fibrous mat facing material in preventing the penetration of a cementitious slurry through the fibrous mat.

Talc powder (Talcron 40-26, particle size 5 microns) dispersed in water containing 0.05 wt. % tri-potassium polyphosphate (dispersant) at various solid loading levels and viscosities is applied to non-woven glass fiber mats to coat the mats at a thickness of 5 mil or 15 mil (based on wet film thickness). The solid loading level, viscosity, and thickness of the finishes are provided in Table 2. Finishes 5-7 also contain a hydroxyethylcellulose viscosity enhancer (0.05 wt. %). Finish 7 further includes 1 wt. % white wax. Thereafter, a cementitious slurry is deposited over the finish material.

TABLE 2

| Finish | Thickness (mil) | Solids (%) | Viscosity (KU) | Results |
|---|---|---|---|---|
| 1 | 5 | 50 | 70 | Reduced slurry penetration |
| 2 | 15 | 50 | 70 | No slurry penetration |
| 3 | 5 | 60 | 119 | No slurry penetration |
| 4 | 15 | 60 | 119 | No slurry penetration |
| 5 | 5 | 20 | 83 | Reduced slurry penetration |
| 6 | 15 | 20 | 83 | Reduced slurry penetration |
| 7 | 5 | 20 | 83 | Reduced slurry penetration |
| 8 (control) | (n/a) | (n/a) | (n/a) | High degree of slurry penetration |

The amount of slurry penetration is visually inspected and compared to a control, which is provided by applying the same slurry to a glass fiber mat that is identical to the mats used to test finishes 1-7, but comprises no finish material.

By comparison to the control mat, a lesser amount of slurry will penetrate the mats comprising a finishing material, showing that the application of a hydrophobic finish to a fibrous mat facing material reduces or eliminates slurry penetration through the fibrous mat.

EXAMPLE 3

The following example illustrates the preparation of a water-resistant cementitious article in accordance with the invention.

A cementitious slurry is prepared using the formulation provided in Table 1 in a board mixer. The siloxane component of the slurry is dispersed in water (e.g., 4.1-4.4 wt. % siloxane in water dispersion) using a 312/45 MS high shear mixer (20 hp, 3600 RPM) manufactured by Silverson Machines, Inc., East Longmeadow, Mass.), and introduced into the gauging water used to prepare the slurry. The siloxane dispersion is introduced into the board mixer in an amount sufficient to provide a final cementitious product comprising 11 lb. siloxane/msf board (about 0.43% wt./wt.). The slurry is used in conjunction with standard manufacturing processes to produce a paper-faced board product that passes the ASTM C1396/C 1396M-06 2-hour immersion target for sheathing without board defects of 10% and for water resistant gypsum backing board of 5% using ASTM Standard Test Method C 473.

A second cementitious slurry is prepared in the same manner, except that an X-Series High Shear Mixer ME-430XS-6 manufactured by Charles Ross & Son Company, Hauppauge, N.Y. instead of the Silverson mixer, and the siloxane dispersion is added to the board mixer in an amount sufficient to provide a final cementitious produce comprising 10 lb. siloxane/msf board (about 0.39% wt./wt.). The slurry is used in conjunction with standard manufacturing processes to produce a paper-faced board product that passes the C1396/C 1396M-06 2-hour immersion target for sheathing without board defects of 10% and for water resistant gypsum backing board of 5% using ASTM Standard Test Method C 473.

In order to produce a product that passes the ASTM C1396 standard using conventional processes, higher levels of siloxane typically are required (e.g., on the order of 12.5 lbs. siloxane/msf or about 0.5% wt./wt.). The foregoing example illustrates that preparing a water-resistant cementitious article in accordance with the invention can be advantageously be used with a lower siloxane loading level.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein. Variations of those preferred embodiments may become apparent to those of ordinary skill in the art upon reading the foregoing description, without departing from the spirit and scope of the invention. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing a water-resistant cementitious article comprising
   (a) preparing an aqueous siloxane dispersion comprising from about 4 wt. % to about 8 wt. % siloxane in water, wherein the aqueous siloxane dispersion comprises dispersed siloxane particles having an average particle size of less than about 50 microns, and does not comprise an emulsifier or dispersant;
   (b) combining the siloxane dispersion with a cementitious mixture to provide a cementitious slurry,
   (c) depositing the cementitious slurry onto a substrate, and
   (d) allowing the cementitious slurry to harden, thereby providing a water-resistant cementitious article.

2. The method of claim 1, wherein the siloxane particles, have, an average particle size of less than about 30 microns.

3. The method of claim 1, wherein the aqueous siloxane dispersion is added to the cementitious mixture in an amount sufficient to provide about 0.3 wt. % to about 2 wt. % siloxane based on the weight of the hardened, dried cementitious slurry.

4. The method of claim 1, wherein the cementitious mixture comprises solid components and liquid components, and the siloxane dispersion is first combined with a liquid component of the cementitious mixture and subsequently combined with the solid components of the cementitious mixture.

5. The method of claim 1, wherein the substrate is a first fibrous mat comprising polymer or mineral fibers.

6. The method of claim 5, wherein the first fibrous mat comprises a hydrophobic finish and the cementitious slurry is deposited on the hydrophobic finish.

7. The method of claim 5, wherein the method further comprises depositing a hydrophobic finish on the fibrous mat before depositing the cementitious slurry on the first fibrous mat.

8. The method of claim 7, wherein the method further comprises drying the hydrophobic finish before depositing the cementitious slurry on the first fibrous mat.

9. The method of claim 6, wherein the hydrophobic finish comprises talc, wax, a hydrophobic resin, a silicone-based compound, a fatty acid or salt thereof, polyethylene glycol, a hydrocarbon or fluorocarbon surfactant having 12 or more carbon atoms, or a combination thereof.

10. The method of claim 6, wherein the hydrophobic finish provides a layer having a thickness of at least about 25 microns.

11. The method of claim 5, wherein the polymer or mineral fibers are glass fibers, polyester fibers, or a combination thereof.

12. The method of claim 5 further comprising contacting the cementitious slurry with a second fibrous mat prior to allowing the cementitious slurry to harden, wherein the cementitious slurry is disposed between the first fibrous mat and the second fibrous mat.

13. The method of claim 1, wherein the cementitious slurry is substantially free of paper or mineral fibers.

14. The method of claim 1, wherein the cementitious slurry is mixed in a mixer comprising a discharge conduit, and foam is added to the cementitious slurry in the discharge conduit prior to depositing the slurry on the substrate.

15. The method of claim 1, wherein the cementitious slurry comprises pre-blended unstable and stable soaps.

16. The method of claim 1, wherein the cementitious slurry comprises a polyphosphate.

17. The method of claim 16, wherein the polyphosphate is sodium trimetaphosphate.

18. The method of claim 1, wherein preparing the aqueous siloxane dispersion comprises the use of a high shear mixer with a tip-speed of about 9,000 to about 15,000 feet per minute (FPM).

19. The method of claim 1, wherein combining the siloxane dispersion with the cementitious mixture comprises adding the siloxane dispersion to gauging water that is subsequently combined with the cementitious mixture in a board mixer.

20. The method of claim 19, wherein preparing the siloxane dispersion comprises continuously supplying the siloxane and the water to an in-line mixer.

* * * * *